United States Patent
Christie et al.

[15] 3,677,678
[45] July 18, 1972

[54] MOULDING MACHINE WITH PIVOTED WELT PLATES

[72] Inventors: Gerald Anthony Christie, Bath; Brian Reginald Doble, Keynsham, both of England

[73] Assignee: G. B. Britton & Sons Limited, Bristol, England

[22] Filed: May 5, 1970

[21] Appl. No.: 34,761

[52] U.S. Cl. ............................................. 425/119, 425/129
[51] Int. Cl. ............................................................ B29c 1/00
[58] Field of Search ............ 18/DIG. 58, 30 US, 5 BM, 5 BA, 18/5 BZ, 34 S

[56] References Cited

UNITED STATES PATENTS

| 3,131,432 | 5/1964 | Battell et al. | 18/30 US |
| 3,523,333 | 8/1970 | Taylor et al. | 8/30 US X |
| 2,429,286 | 10/1947 | Young | 18/DIG. 58 |
| R25,290 | 12/1962 | Parfrey | 18/5 BA X |
| 3,339,236 | 7/1967 | Battell et al. | 18/30 US X |
| 3,358,333 | 12/1967 | Kitchener et al. | 18/30 US |
| 3,548,044 | 12/1970 | Gallay | 18/5 BZ X |

FOREIGN PATENTS OR APPLICATIONS

| 890,439 | 2/1962 | Great Britain | 18/34 S |
| 638,721 | 4/1962 | Italy | 18/34 S |

Primary Examiner—J. Spencer Overholser
Assistant Examiner—Michael O. Sutton
Attorney—Hall, Pollock & Vande Sande

[57] ABSTRACT

An injection moulding apparatus for forming footwear with moulded soles, of plastics materials, e.g. of polyvinylchloride or polyurethane foam, in which the injection apparatus is positioned below a support for an upwardly facing mould and is connected directly to an injection passage passing upwardly through the mould support and into the mould. A last is supported above the mould and means are provided for raising and lowering the last support and for pressing it down on to the top of the mould during the moulding operation. The injection passage is preferably positioned centrally adjacent the waist of the shoe. The mould may have movable welt plates around its periphery, which rise to allow removal of the footwear from the mould.

7 Claims, 7 Drawing Figures

Patented July 18, 1972

Gerald Anthony Christie
Brian Reginald Doble
INVENTORS

BY
Hall, Pollock & Vande Sande
ATTORNEYS

Patented July 18, 1972

Gerald Anthony Christie
Brian Reginald Doble
INVENTORS

BY
Hall, Pollock & Vande Sande
ATTORNEYS

Patented July 18, 1972
3,677,678
4 Sheets-Sheet 3
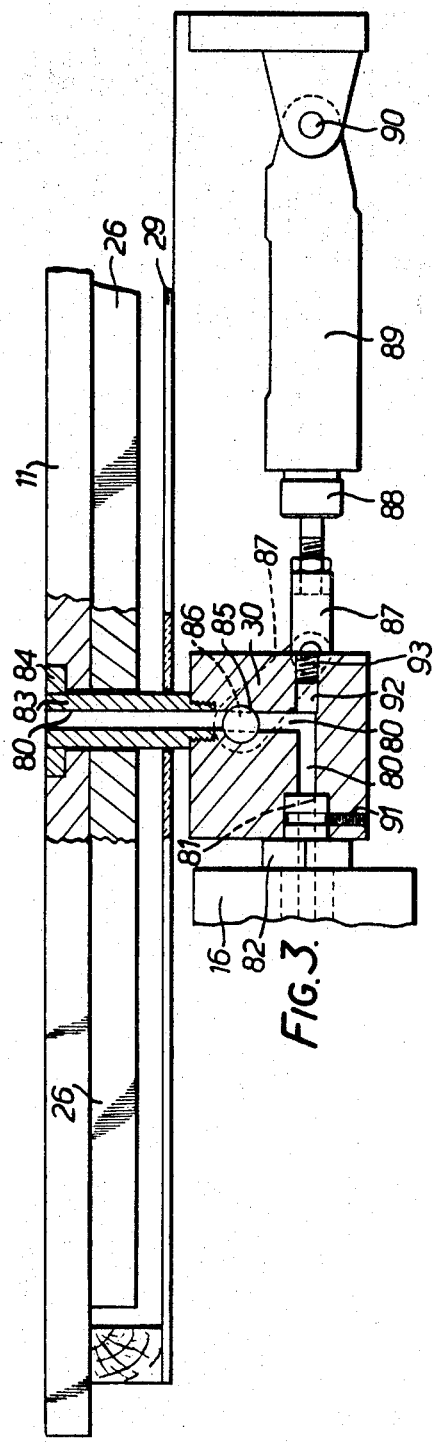
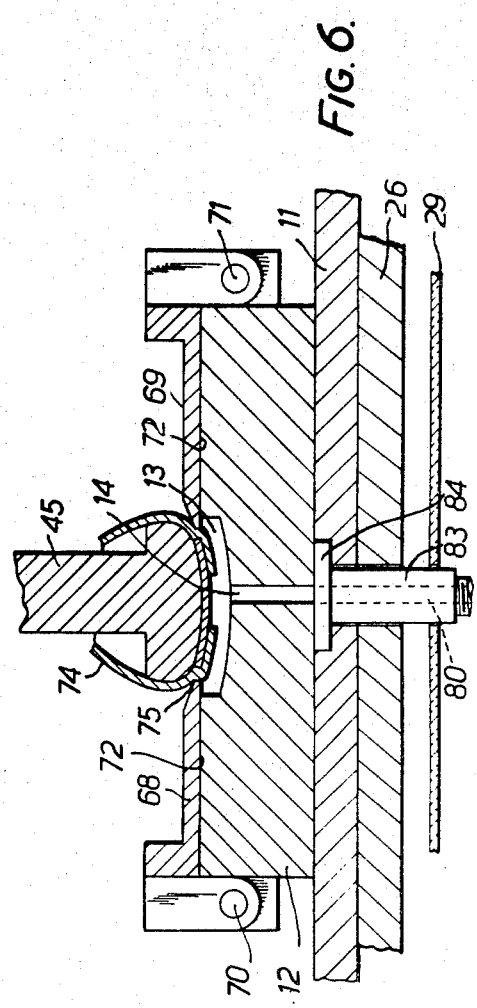
Gerald Anthony Christie
Brian Reginald Doble
INVENTORS
BY Hall, Pollock & Vande Sande
ATTORNEY

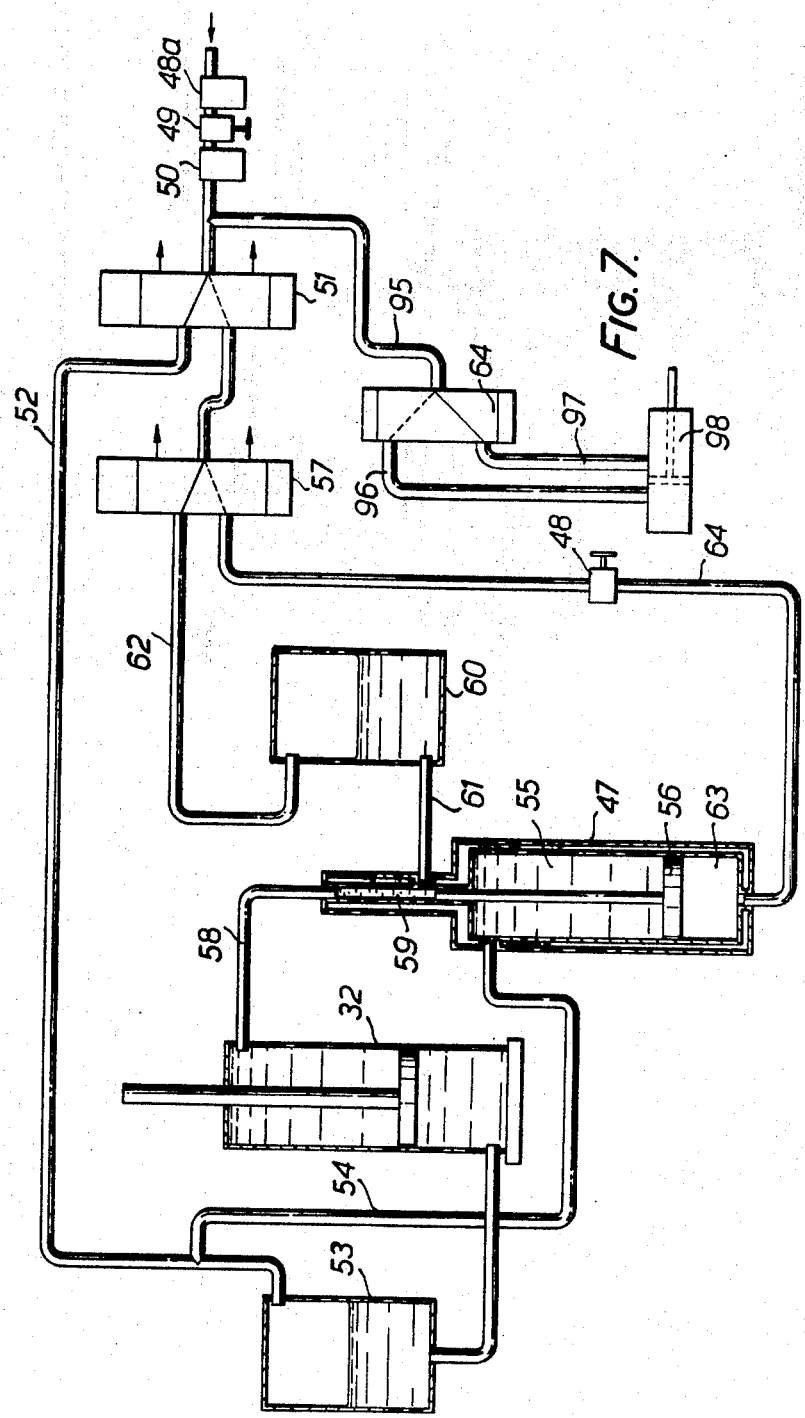

3,677,678

MOULDING MACHINE WITH PIVOTED WELT PLATES

This invention relates to moulding machines for forming footwear with moulded soles and is particularly, though not exclusively, applicable to injection moulding machines, as used for example for moulding footwear with polyvinylchloride or other thermoplastic soles, or machines for injecting other synthetic plastics materials such as polyurethane foaming material or thermosetting plastics materials.

In conventional shoe moulding machines, the sole moulding cavity is formed by two half mould sections which mate along the length of the cavity and can be opened and closed by horizontal movement under the control of two pneumatic rams sequenced by an automatic control. One of the factors determining the use of a split design for such a mould is the fact that the welt of the sole would otherwise be trapped by the over-hanging edge parts of the mould which form the welt surface.

It is one object of the present invention to provide an improved moulding machine which will eliminate or reduce the number of separate mould elements, and especially the control system therefor.

It is another object of the invention to provide an improved moulding machine, especially for use in moulding footwear soles of polyvinylchloride or of polyurethane foam.

SUMMARY OF THE INVENTION

From one aspect the invention consists in a machine for forming footwear with moulded soles, comprising a mould support for supporting a mould with an upwardly facing mould cavity, an injection apparatus positioned below the mould support and connected directly to an injection passage passing upwardly through the mould support, and last supporting apparatus above the mould support, including means for moving a last support generally vertically above the mould support and for exerting downward pressure on said last support.

Preferably the injection apparatus comprises a heated screw-type injection machine having heating equipment and a discharge nozzle connected directly to the injection passage in the mould support, and conveniently the injection passage is positioned centrally adjacent the waist of the shoe or other article of footwear.

From another aspect the invention consists in a moulding machine for moulding footwear with moulded soles including a support for a one-part mould with an upwardly facing mould cavity, means for injecting a synthetic plastics or other material into the mould cavity, means for supporting a last carrying a shoe upper above the mould support, the mould being provided with movable or flexible welt plates around the periphery of the mould cavity and movable between a closed position in which the welt plates define the welt surface of the sole and an open position in which the plates allow the sole to be withdrawn from the mould, and means for urging the last support downwards so as to engage the shoe upper under pressure against the welt plates.

Preferably the welt plates are pivotally attached to the mould, and are arranged to open automatically as the last is withdrawn upwards after a moulding operation, and conveniently the welt plates are pivoted upwards by the welt of the moulded sole itself.

The invention also consists in a method of forming an article of footwear with a moulded sole in which a pre-formed upper is caused to cooperate with a mould to define a sole moulding cavity, the cavity is filled with the desired moulding material to form the sole, the upper edges of the cavity which define the welt of the sole are withdrawn in relation to the mould proper, and the article of footwear with the sole moulded into position is withdrawn from the mouth of the mould cavity.

Preferably the mould is a one-part mould, and the cavity is filled by injection from below the mould.

Further the invention also resides in an article of footwear formed by the apparatus or method defined.

BRIEF DESCRIPTION OF THE DRAWINGS

The invention may be performed in various ways and one specific embodiment, with some possible modifications, will now be described by way of example with reference to the accompanying drawings, in which:

FIG. 3 is an elevation on an enlarged scale to that of FIG. 1 of a refrigerated base plate and a discharge nozzle;
FIG. 6 is a section on the line VI — VI of FIG. 4;
and
FIG. 7 is a pneumatic/hydraulic circuit diagram.

DESCRIPTION OF THE PREFERRED EMBODIMENTS

Figure 4:
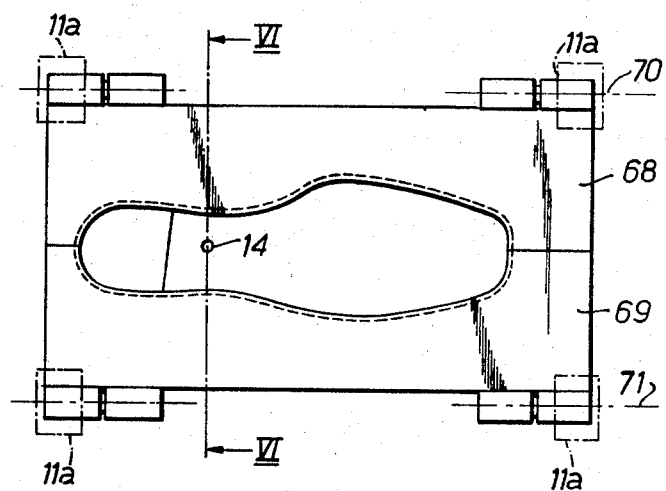
FIG. 4 is a plan view of a mould.

Referring to the drawings, the moulding machine comprises a base frame 10 formed mainly of box section lengths of steel welded together and supporting a horizontal table or base plate 11 having clamps 11a, shown in dotted lines in FIG. 4, for releasably securing in position thereon a particular selected one-part mould 12 formed with an upwardly facing sole mould cavity 13 of the required shape and size in its upper surface. The mould has a vertical injection port or drilling 14 extending downwards from the waist of the mould cavity, i.e. from a position between the heel and the ball of the moulded sole, and communicating with the nozzle 31 of a screw-type plastics injection unit 15 beneath the plate 11. The clamps 11a enable the mould 12 to be readily replaced by another, e.g. for moulding footwear of a different type or size. Each mould 12 has an injection port 14 disposed so as to register with a vertical bore 80 passing through the base plate 11 and communicating with the injection unit 15 as described below.

The mould 12, see FIG. 6, is formed in one unit, either as an integral one-part body or as a number of sections securely clamped together. The mould cavity 13 has no, or no appreciable, over-hanging projections at its upper rim and the welt surface of the mould cavity is formed by a pair of welt plates, 68, 69, respectively pivotally connected to the mould on horizontal axes 70, 71 positioned along the two opposite edges thereof parallel to the length of the shoe cavity and beneath the bottom surface of the mould cavity. These welt plates have accurately finished polished under surfaces 72, designed to make close engagement with the corresponding upper surfaces of the mould, and the welt plates tend to fall naturally by gravity into position on the upper edges of the mould cavity. Alternatively the plates may be spring-urged into this position.

The injection unit 15 is of generally known type and comprises a horizontal screw impeller in a casing 16 surrounded by a heating jacket 17, a pulley drive 18 for the impeller at one end 19, and a holder 20 for the raw plastics material, such as p.v.c. chips, leading downwards to an entry point at the end 19 of the impeller casing. The pulley drive 18 comprises a pulley 21 mounted on the impeller shaft and driven through V-belts 22 by an electric motor 23. The holder 20 is pivotally mounted about a horizontal transverse axis 24 and carries a transverse bar 25 which in the operative position of the holder rests in V-shaped notches at the tops of transversely spaced fixed supports.

The base plate 11 is arranged to be cooled by a cooling medium which flows through a conduit cast in an aluminum plate 26 secured to the undersurface of the base plate. The cooling medium is cooled by refrigerating apparatus which is mounted on a plate fixed to the frame 10 beneath the injection unit 15 and includes a pump, a condensing unit, a cooler, a temperature controller in a housing 27 and a controlling switch responsive to the pressure of the cooling medium. The conduit is preferably curved, e.g. at least partly sinusoidal, as seen in plan, and is disposed in an overall shape to provide good cooling of substantially all the base plate 11. A hinged door 28 extends across the front of the machine beneath the plate 11. A sheet 29 of syndario is secured to and spaced from the plate 26 by screws to provide thermal insulation for the plate 26.

The discharge nozzle 31 of the injection unit 15 comprises a block 30 (FIG. 3), which is electrically heated under the control of a thermostat, and is formed with a bent bore 80 which communicates with a corresponding bore 81 in a part 82 which is threaded into the end of the casing 16. The bore 80 passes through a further part 83 which has a flange 84 accommodated in a recess in the upper surface of the plate 11 and is in threaded engagement with the block 30 at its lower end. The upright portion of the bore 80 incorporates a rotatable shut-off valve member 85 having a bore 86 therethrough and which can be rotated through a mechanical linkage 87 by a pneumatically operated piston 88 movable in a cylinder 89 pivotally connected to the main frame at 90. A locking screw 91 secures the part 82 to the block 30 and a threaded bore 92 receives a threaded plug 93 which may be removed to allow blow cleaning of the bore 80.

The piston of a vertically extending hydraulic ram 32 mounted on the frame 10 beneath the plate 11 is connected to a cross frame 33 which at its ends is releasably connected by studs and nuts 34 to the lower ends of two upright pillars 35 which can slide vertically in guides 36 fixed to the frame 10.

Figure 1:
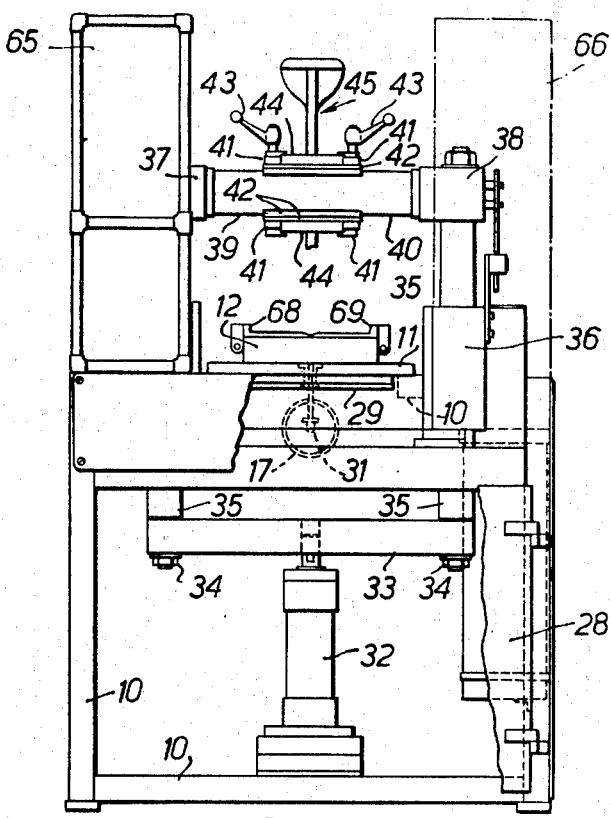
FIG. 1 is a front elevation of a footwear moulding apparatus with parts broken away for clarity.
Figure 5:
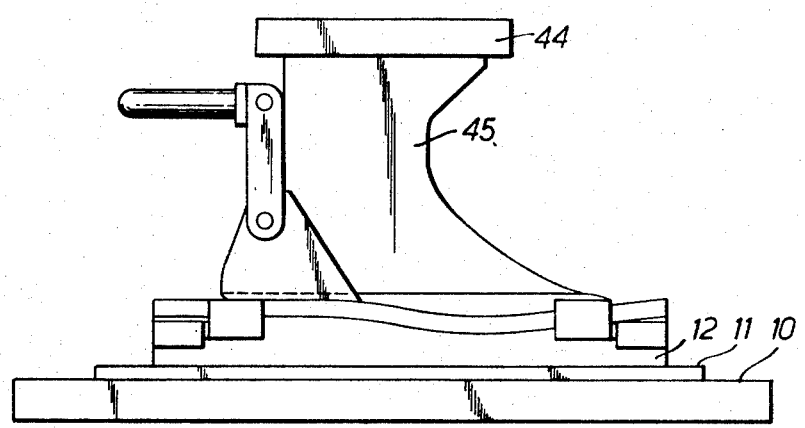
FIG. 5 is a side elevation of a moulding last in moulding position above the mould.
Figure 2:
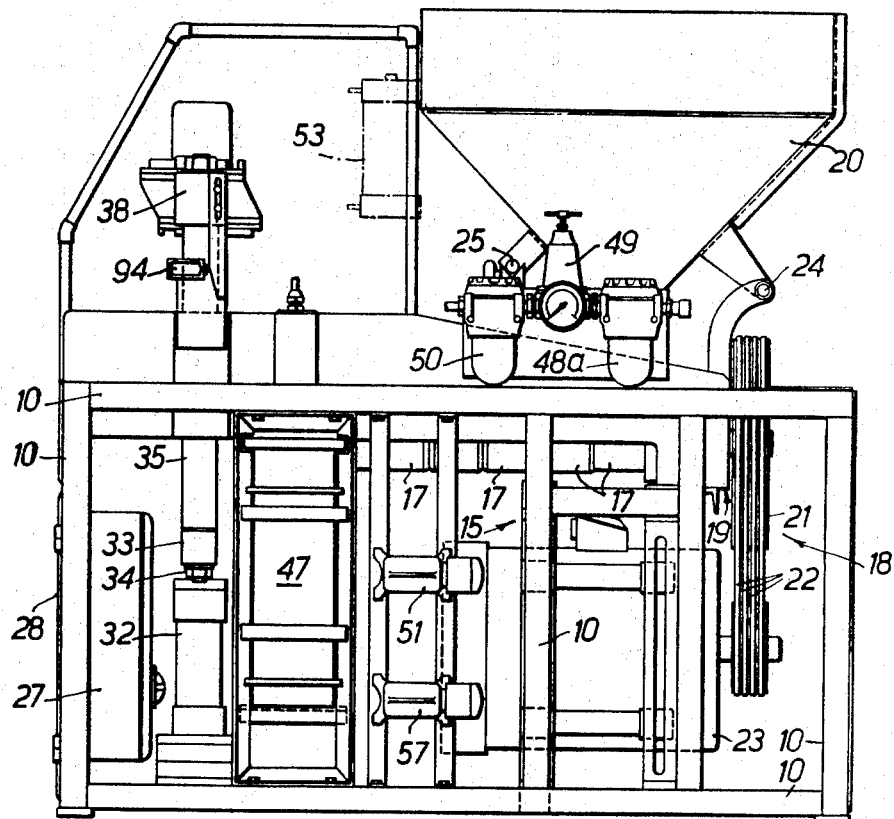
FIG. 2 is a side elevation from the right-hand side of FIG. 1.

Housings 37, 38 for trunnions 39, 40 are respectively removably mounted on the upper ends of the pillars 35, the trunnions being welded to central flat connecting plates 42 and rotatable in bearings in the housings. Clamps 41, spring-biased to a non-clamping position, are mounted on the edges of the connecting plates 42, each clamp having an operating handle 43. In FIG. 1, only two of the handles 43 are shown, and they are omitted from FIG. 2 for clarity.

Each pair of clamps 41 is arranged to hold a mounting plate 44 of a metal last 45 firmly against one of the plates 42. Only one last 45 is shown in FIG. 1 and none in FIG. 2, but in use there will normally be two lasts supported on the plates 42 on opposite sides of the trunnions 39, 40. A spring-biassed detent, which may be released by manually operating a handle (not shown), is associated with the housing 37 and is arranged to hold the trunnions in either of two positions angularly spaced by 180° and in each of which the plates 42 are substantially horizontal, so that one last 45 extends vertically upwards, as shown in FIG. 1, while the other extends vertically downwards towards the sole mould 12. On release of the detent, the position of the lasts can be reversed. Thus one last is readily accessible for removal of a completed shoe and application of a fresh upper, or for replacement of the whole last, while the other last is in position for moulding. The clamps 41 make replacement of a last 45 an easy and rapid proceeding. The location of the injection passage 14 in the waist of the cavity 13 of the sole mould 12 and directly beneath the last support (plates 42 etc.) brings the advantage that moulds for a wide range of footwear types and sizes can utilize the same short injection passage of bore 80.

The ram 32 controls the vertical movements of the last support and hence of the last 45 in the moulding position below the support. The ram 32 is connected by flexible conduits to an air-oil pressure intensifier 47 and the control system for this includes a pressure regulating device 48 for varying the pressure of the air in this intensifier. One suitable circuit is shown in FIG. 7.

Air under pressure is supplied by a compressor (not shown) through a filter 48a, a pressure regulator 49 and a lubricator 50 to a solenoid-operated valve 51. From the valve 51 the air may pass through a conduit 52 to a reservoir 53 containing air and oil and through a conduit 54 to a space 55 above a piston 56 in the intensifier 47. This gives the condition of the last in the up, i.e. non-moulding, position.

Alternatively air may pass from the valve 51 to another solenoid-operated valve 57 which is controlled by a switch 94 actuated by a cam 94a at a predetermined position of the ram and last support. The valve 57 is connected by a conduit 62 to an air/oil reservoir 60 which operates the ram 32 through a passage 59 in the intensifier 47 to give a low pressure initial stroke of the ram. The valve 57 can be changed over as described below to the dotted position in which it communicates through the pressure regulating valve 48 in conduit 64a with a space 63 below the intensifier piston 56 which transmits a high pressure stroke to the ram through high pressure hose 58. A further solenoid-operated valve 64 controls through conduits 96, 97 the air flow to the air cylinder 89 which operates the nozzle shut off valve 85. The valve 64 receives pressure air through a conduit 95 and is normally in the full line position.

The valves 51, 57 and 64 are biased by springs to their positions shown in full lines, in which situation the ram 32 is in its raised position and the injection nozzle shut off valve 85 is in the closed position.

Electrical control apparatus is mounted in housings 65, 66 above the ram, the housing 66 being shown in chain line for clarity.

In use, after the injection unit 15 has been allowed to heat up to its operating temperature and two lasts 45 each carrying a pre-formed shoe upper 74 have respectively been mounted on the plates 42, the operator presses simultaneously two buttons in the control apparatus to lower the ram 32 and the last support. The buttons are well spaced so that both hands of the operator are required to press the buttons; this is a safety feature which prevents the operator's hands being damaged by the downwardly moving parts.

On operation of the buttons the solenoid valve 51 moves to its dotted position and air under pressure is supplied through valve 57, which is in its full line position, to pipe 62 and the reservoir 60 which delivers oil under pressure along pipe 61 to the passage 59 of the intensifier 47. This gives a low pressure stroke on the ram 32 to lower it.

At a predetermined position the downward stroke of the ram operates the switch 94 which energizes the solenoid-operated valve 57 which moves to its dotted line position and allows air to pass through the pressure regulator 48 to the bottom of the intensifier 47. This moves the piston 56 upwards and exerts a higher (intensified) pressure on the oil in the cavity 59, which produces a high pressure downward stroke on the ram 32 to hold the shoe upper 74 firmly against the welt plates 68, 69, as shown in FIG. 6.

This further downward movement of the ram activates another limit switch (not shown) which starts the electric motor 23 to rotate the injection screw and activates the valve 64 which allows air to move the piston 88 in the cylinder 89 and thus opens the nozzle cut-off valve 85. Hot polyvinylchloride is then injected through the injection passage 14 so as to fill the mould cavity.

The period of operation of the screw is determined by a microswitch device which is associated with the mould and which is activated when the mould cavity is full and stops the screw and activates the valve 64 to allow air on the other side of cylinder 89 to shut the shut-off valve 85 on the nozzle. An injection timer may be provided arranged to over-ride the microswitch device and which can also be used to control the injection time.

The air pressure in the intensifier may be adjusted for example in the range 10 to 100 p.s.i., the intensifier may have an oil/air pressure ratio of 25:1, and the maximum thrust of the ram may be of the order of 6,000 pounds. The last support moves downwards until the edges of the leather 75 of the lower shoe upper engage and press down on to the welt plates 68, 69 thus forming a completely sealed sole moulding cavity.

The material is then cooled by the cooling medium if the refrigeration apparatus is in operation or allowed to cool, for a period which is controlled by the timing device.

Actuation of the microswitch when the cavity is full conditions the control apparatus to move the solenoid valve 51 to its full line position after a pre-set cooling period, whereupon air is supplied to reservoir 53 to raise the ram 32, oil displaced from the ram through the hose 58 passing to the reservoir 60 from which air may flow to exhaust through valve 57. As the ram and last are raised, the moulded welts of the shoe automatically lift the welt plates 68, 69 causing them to pivot about their hinged axes 70, 71 thus opening the mould cavity to allow the shoe to be withdrawn. When the last support reaches its uppermost position, the operator releases the detent associated with the housing 37 and rotates the trunnions through 180°, whereupon the detent re-engages, to bring the previously upper last beneath the trunnions and the last carrying the shoe with the moulded sole above the trunnions. The shoe is then removed and replaced by a further pre-formed shoe upper, and the operator may then again press the two buttons to start a second cycle of operation.

Certain modifications are possible: for example the injection screw could be vertically disposed with the material holder 20 below the base plate 11, and the ram could be located above the last support. Also the machine could be arranged to operate automatically, under the control of the control apparatus, including the indexing of the trunnions, the operator loading the pre-formed shoe uppers on to the lasts and unloading the shoe uppers with moulded soles from the lasts. The apparatus can be modified to inject suitable material other than synthetic plastics into the mould cavity.

In a further possible modification, the welt plates are formed of an elastomeric material such as rubber and parts of the plates spaced somewhat from the projecting lips are anchored to the top surface of the mould so as to allow the welt plates to flex roughly in the same manner as the pivoted arrangement described above. The resilience of the rubber material will automatically restore the welt plates to their horizontal positions when a shoe has been withdrawn.

It may be desirable in some circumstances to provide additional sealing means between the welt plates and the upper surface of the mould, to prevent the injected material entering between these two parts. In some cases it may also be desirable to form the welt plates in a number of separate components each individually movable, and some of these component welt plates may be pivotally mounted on hinge axes which are inclined relative to one another, thus facilitating withdrawal of the welt plates adjacent the toe and heel of the moulded footwear.

The one-part mould could be formed from two separate side mould units machined separately and subsequently rigidly secured together.

It will be noted that in these examples the only moving part which requires external operation is the last support. The welt plates open and close automatically and require no external operating mechanism. The injection unit being positioned immediately below the mould avoids the risk of material becoming solidified in the supply passages and the length of the injection passage through the mould can be maintained at an absolute minimum. By comparison, when injecting from the heel or toe of a mould the length of the injection passage must sometimes be extended undesirably, particularly when the mould cavity is small, as for a small size shoe, in relation to the external dimensions of the mould block.

Also, the last support is disposed above the injection unit in the mould support and the injection passage in a mould on the support, and there is thus no need to move the last support or the mould support to accommodate different sizes of mould, each mould being located with its injection passage in the same position.

We claim:

1. A molding machine for forming molded soles on articles of footwear, comprising a mold support, a unitary sole mold having bottom and side walls defining an upwardly facing mold cavity mounted on said mold support, a plurality of movable welt plates located around the outer periphery of the mold cavity, and movable relative to the side walls of said cavity in an upward and outward direction between a lower position in which the welt plates define the welt surface of the molded sole and an upper open position in which the welt plates allow a molded sole to be withdrawn from the mold, said welt plates being returned automatically into the lower position before the next molding cycle, an injection apparatus positioned below the mold support and connected directly to an injection passage passing through the mold support and into said sole mold, and last supporting apparatus above the mold support, including power operated means for moving a last support generally vertically between upper and lower positions above said mold support, for moving said welt plates automatically into their open position upon movement of said last support toward its upper position and for exerting downward pressure on said last support in its lower position to form a seal between an article of footwear carried on a last attached to said last support and said welt plates in their lower positions.

2. A machine as claimed in claim 1, in which the means for moving the last support comprises a fluid-operated ram beneath the mold support.

3. A molding machine according to claim 1, in which the side walls of said sole mold are fixed in position relative to one another.

4. A molding machine according to claim 1, wherein said welt plates are pivotally connected on horizontal pivot axes to relatively fixed members secured to said sole mold.

5. A molding machine for molding soles on articles of footwear, including a support for a unitary sole mold, having relatively fixed side walls, means for supporting a last carrying a shoe upper in vertical alignment with said mold support, said mold being provided with a plurality of movable welt plates located around the periphery of said mold cavity and each freely movable partly in an outward direction and partly in a vertical direction away from said mold support between a substantially horizontal closed position in which the welt plates define the welt surface of the molded sole, and an open position in which said welt plates are further separated to allow the molded sole to be withdrawn from the mold, means for urging the last support in a vertical direction towards said mold to engage said shoe upper under pressure against said welt plates, and thereby define a complete molding cavity for said molded sole, means for injecting a synthetic plastics material into said mold cavity and means for urging the last support in a vertical direction away from said mold and operative to move said welt plates to their open position while simultaneously effecting withdrawal of a molded sole from said mold cavity.

6. A molding machine according to claim 5, in which said welt plates are pivotally attached to said sole mold on fixed horizontal axes.

7. A molding machine according to claim 5, in which said welt plates are arranged to open automatically as a result of the vertical force exerted by a molded sole when said last is withdrawn vertically away from said sole mold after a molding operation.

* * * * *